United States Patent
Willis et al.

(10) Patent No.: US 8,849,701 B2
(45) Date of Patent: Sep. 30, 2014

(54) ONLINE VIDEO GAME ADVERTISING SYSTEM AND METHOD SUPPORTING MULTIPLAYER ADS

(75) Inventors: Daniel Willis, Stittsville (CA); Dhananjay Godse, Kanata (CA); Gordon Freedman, Nepean (CA)

(73) Assignee: Google Inc., Mountain View, CA (US)

( * ) Notice: Subject to any disclaimer, the term of this patent is extended or adjusted under 35 U.S.C. 154(b) by 2215 days.

(21) Appl. No.: 11/299,694

(22) Filed: Dec. 13, 2005

(65) Prior Publication Data

US 2006/0128469 A1 Jun. 15, 2006

Related U.S. Application Data

(60) Provisional application No. 60/634,986, filed on Dec. 13, 2004, provisional application No. 60/634,985, filed on Dec. 13, 2004, provisional application No. 60/634,996, filed on Dec. 13, 2004.

(51) Int. Cl.
*A63F 13/00* (2014.01)
*A63F 13/30* (2014.01)

(52) U.S. Cl.
CPC .......... *A63F 13/12* (2013.01); *A63F 2300/5573* (2013.01); *A63F 2300/5506* (2013.01)
USPC .................... 705/14.58; 705/14.4; 705/14.73; 705/14.66; 463/30; 463/42

(58) Field of Classification Search
USPC ............... 463/30, 42; 705/14.4, 14.49, 14.58, 705/14.66, 14.41, 14.5, 14.73
See application file for complete search history.

(56) References Cited

U.S. PATENT DOCUMENTS

| | | | |
|---|---|---|---|
| 5,724,424 A | 3/1998 | Gifford | |
| 5,768,382 A | 6/1998 | Schneier et al. | |
| 5,816,918 A | 10/1998 | Kelly et al. | |
| 5,941,772 A | 8/1999 | Paige | |
| 5,946,664 A | 8/1999 | Ebisawa | |
| 6,036,601 A * | 3/2000 | Heckel .......................... | 463/42 |
| 6,196,920 B1 | 3/2001 | Spaur et al. | |
| 6,285,985 B1 | 9/2001 | Horstmann | |
| 6,430,301 B1 | 8/2002 | Petrovic | |
| 6,442,259 B2 | 8/2002 | Culli et al. | |
| 6,513,052 B1 | 1/2003 | Binder | |
| 6,640,336 B1 | 10/2003 | Ebisawa | |
| 6,704,415 B1 | 3/2004 | Katayama et al. | |
| 6,882,978 B2 | 4/2005 | Ebisawa | |
| 6,928,414 B1 | 8/2005 | Kim | |
| 7,085,733 B2 | 8/2006 | Ebisawa | |
| 7,249,383 B1 | 7/2007 | McCully et al. | |
| 7,452,278 B2 | 11/2008 | Chen et al. | |
| 2001/0010059 A1 | 7/2001 | Burman et al. | |
| 2002/0004743 A1 | 1/2002 | Kutaragi et al. | |

(Continued)

FOREIGN PATENT DOCUMENTS

EP 1 087 312 A2 3/2001

*Primary Examiner* — Jasson Yoo
(74) *Attorney, Agent, or Firm* — Fish & Richardson P.C.

(57) ABSTRACT

In a video game session supporting a set of gamers participating in the game from a variety of different locations, an opportunity to provide an advertisement is presented. The content of the advertisement is chosen based upon specific criteria such as data relating to one of the gamers, for example, the location of the gamer. The chosen content of the advertisement is provided within an advertising spot of the video game.

22 Claims, 17 Drawing Sheets

| Spot | Persistence | Ubiquity | Location | Reachability | Size | Type | Number | Duration | |
|---|---|---|---|---|---|---|---|---|---|
| spot1 | yes | yes | sign | 90% | large | image | 1 | session | 14a |
| spot2 | no | no | sand | 10% | small | image | | 15 sec. | 14b |
| spot3 | yes | yes | tv | 40% | small | video | | 15 sec. | 14c |
| spot4 | no | no | inventory | 100% | large | texture | 1 | game | 14d |
| spot5 | yes | yes | inventory | 100% | large | object | 1 | level | 14e |
| spot6 | no | no | scenery | 35% | large | object | 6 | game | 14f |

(56) References Cited

U.S. PATENT DOCUMENTS

| | | |
|---|---|---|
| 2002/0059148 A1 | 5/2002 | Rosenhaft et al. |
| 2002/0072413 A1 | 6/2002 | Arias et al. |
| 2002/0082910 A1 | 6/2002 | Kontogouris |
| 2002/0116263 A1 | 8/2002 | Gouge |
| 2002/0120589 A1 | 8/2002 | Aoki |
| 2003/0177187 A1 | 9/2003 | Levine et al. |
| 2004/0015608 A1* | 1/2004 | Ellis et al. ............ 709/246 |
| 2004/0043806 A1 | 3/2004 | Kirby et al. |
| 2004/0073909 A1 | 4/2004 | Arimilli et al. |
| 2004/0116183 A1 | 6/2004 | Prindle |
| 2004/0128364 A1 | 7/2004 | Clark |
| 2004/0143852 A1 | 7/2004 | Meyers |
| 2004/0221178 A1 | 11/2004 | Aaron et al. |
| 2005/0098955 A1 | 5/2005 | Rasmussen |
| 2005/0137015 A1 | 6/2005 | Rogers et al. |
| 2005/0246638 A1 | 11/2005 | Whitten |
| 2005/0255923 A1 | 11/2005 | Aoki |
| 2007/0043616 A1 | 2/2007 | Kutaragi et al. |
| 2008/0102947 A1 | 5/2008 | Hays et al. |

* cited by examiner

| Spot | Persistence | Ubiquity | Location | Reachability | Size | Type | Number | Duration |
|---|---|---|---|---|---|---|---|---|
| spot1 | yes | yes | sign | 90% | large | image | 1 | session |
| spot2 | no | no | sand | 10% | small | image | | 15 sec. |
| spot3 | yes | yes | tv | 40% | small | video | | 15 sec. |
| spot4 | no | no | inventory | 100% | large | texture | 1 | game |
| spot5 | yes | yes | inventory | 100% | large | object | 1 | level |
| spot6 | no | no | scenery | 35% | large | object | 6 | game |

Columns 14a–14f labeled above: Reachability (14a), Size (14b), Type (14c), Number (14d), Duration (14e), and an additional marker 14f.

Fig. 14

ONLINE VIDEO GAME ADVERTISING SYSTEM AND METHOD SUPPORTING MULTIPLAYER ADS

REFERENCE TO PRIOR APPLICATION

This application claims benefit of U.S. Provisional Patent Application Nos. 60/634,986; 60/634,985 and 60/634,996, all filed on Dec. 13, 2004, the entire contents of which is incorporated herein by reference.

FIELD OF THE INVENTION

The invention relates to video games and more particularly to dynamic advertising within video games.

BACKGROUND

During recent years, computer gaming has gained increasing popularity, and today millions of players are playing on Internet enabled gaming systems all around the world. Predictably, interactive computer gaming has blurred the line between games and other entertainment or communication media, and the avenues explored in the development of gaming might well break new ground for interactive Internet applications for all areas of business relations and social life.

Due to their dynamic nature and specific appeal to certain audiences, computer games and especially games played on Internet enabled platforms provide the ideal vehicle for Internet advertising. Not only is it possible for an advertiser to directly target a specific group of customers, but also advertisements can be directly incorporated into the computer games, enabling something similar to the well-known concept of product placement. It would therefore be highly advantageous to have at hand a system for effectively combining the two concepts elucidated above, and thus building a bridge from the advertising world to the world of computer gaming.

SUMMARY OF THE INVENTION

In accordance with the invention there is provided a method comprising: providing a game session of a game in execution and having a plurality of gamers engaged therein, the plurality of gamers playing in a plurality of locations, one remote from another; providing an advertising spot within the game; determining advertising content for being inserted within the advertising spot and based on data relating to at least one of the plurality of gamers; and inserting the determined advertising content within the advertising spot during the game session.

In an embodiment, the game is a massively multiplayer online game.

In accordance with another embodiment of the invention there is provided a method comprising: providing a game session of a game in execution and having a plurality of gamers engaged therein, the plurality of gamers playing in a plurality of locations, one remote from another; providing an advertising spot within the game; determining advertising content for being inserted within the advertising spot; and inserting the determined advertising content within the advertising spot during the game session, at least a predetermined plurality of the plurality of gamers having a same advertising content presented at approximately a same time within the game session.

In accordance with yet another embodiment of the invention there is provided a method comprising: providing a game session of a game in execution and having a plurality of gamers engaged therein, the plurality of gamers playing in a plurality of locations, one remote from another; providing an advertising spot within the game; determining advertising content for being inserted within the advertising spot; and inserting the determined advertising content within the advertising spot during the game session, the advertising content having a persistence relating to a characteristic of the advertising spot.

Preferably, more than one advertising spot is defined for a same game.

BRIEF DESCRIPTION OF THE DRAWINGS

Embodiments of the instant invention will now be described in conjunction with the following drawings, in which:

FIG. 14 shows a simplified table of ad spot characteristics;

DETAILED DESCRIPTION OF EMBODIMENTS OF THE INVENTION

Figure 1:
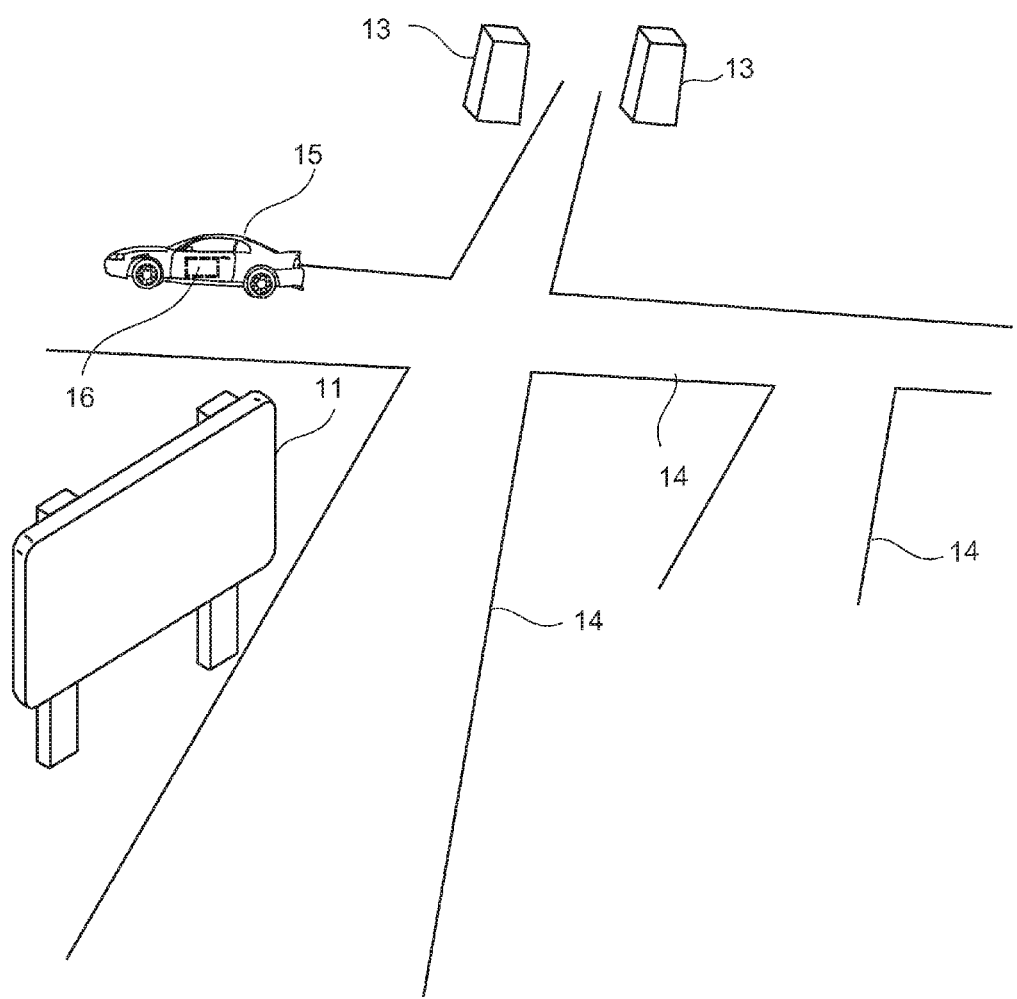
FIG. 1 shows a simplified scene from a video game in which a billboard and a vehicle are shown for displaying an advertisement therein.

Referring to FIG. 1, shown is a simplified scene from a video game in which a billboard 11 is shown for displaying an advertisement therein. The billboard 11 is shown in the midst of a landscape including buildings 13 and roads 14. On one of the roads 14 is shown a vehicle 15 having a spot 16 for displaying of an advertisement therein. As is evident, the billboard 11 is relatively prominent and noticeable rendering advertisements displayed thereon prominent and noticeable; this is highly desirable. Also, the billboard 11 is a visual cue within the scene; it is a landmark. Conversely, the vehicle 15 is expected to move and change and is less useful as a visual cue or as a landmark.

Figure 2:
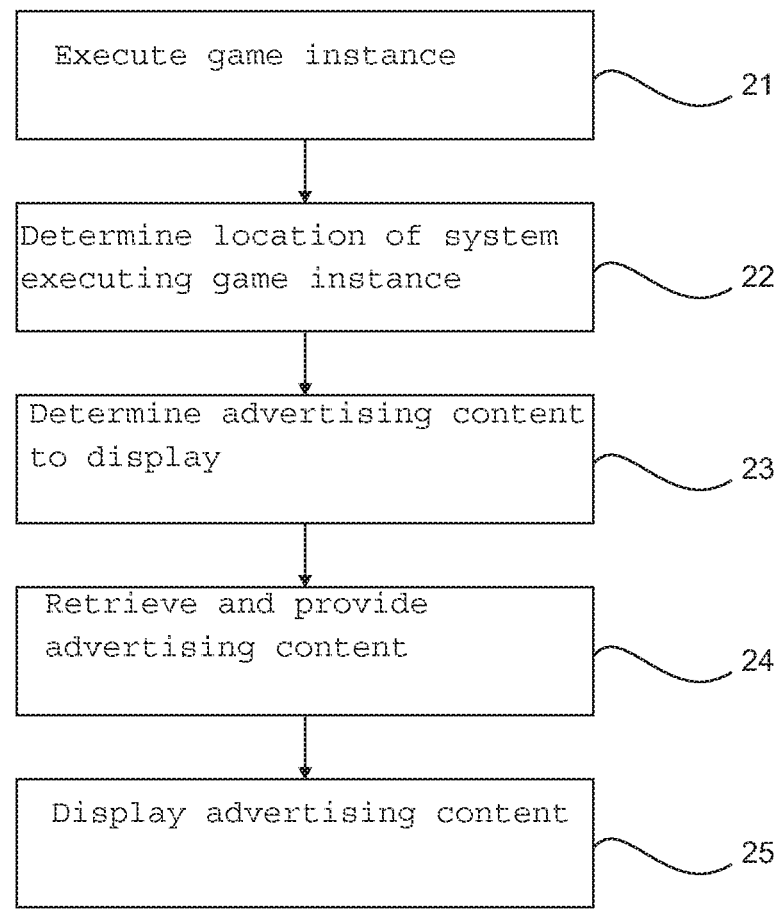
FIG. 2 shows a simplified flow diagram of a method of determining advertising content to insert within the billboard 11.

Referring to FIG. 2, shown is a simplified flow diagram of a method of determining advertising content to insert within the billboard 11 and onto the vehicle 15. A game instance is executed at step 21. At 22, a location of the system in execution of the game instance in the form of a real world geographic location is determined. The location is then used to determine appropriate advertising content to display on the billboard 11 at step 23. At step 24, the appropriate advertising content is retrieved and provided to the game instance and at 25 the advertising content is displayed within the billboard 11. The advertising content remains on the billboard 11 until the game instance is terminated and another game instance is executed. Optionally, the advertising content persists across game instances within a same session—a same execution of the game software. Alternatively, game sessions are defined by a game provider. Alternatively, each new game results in different advertising content being displayed on billboard 11.

Figure 3:
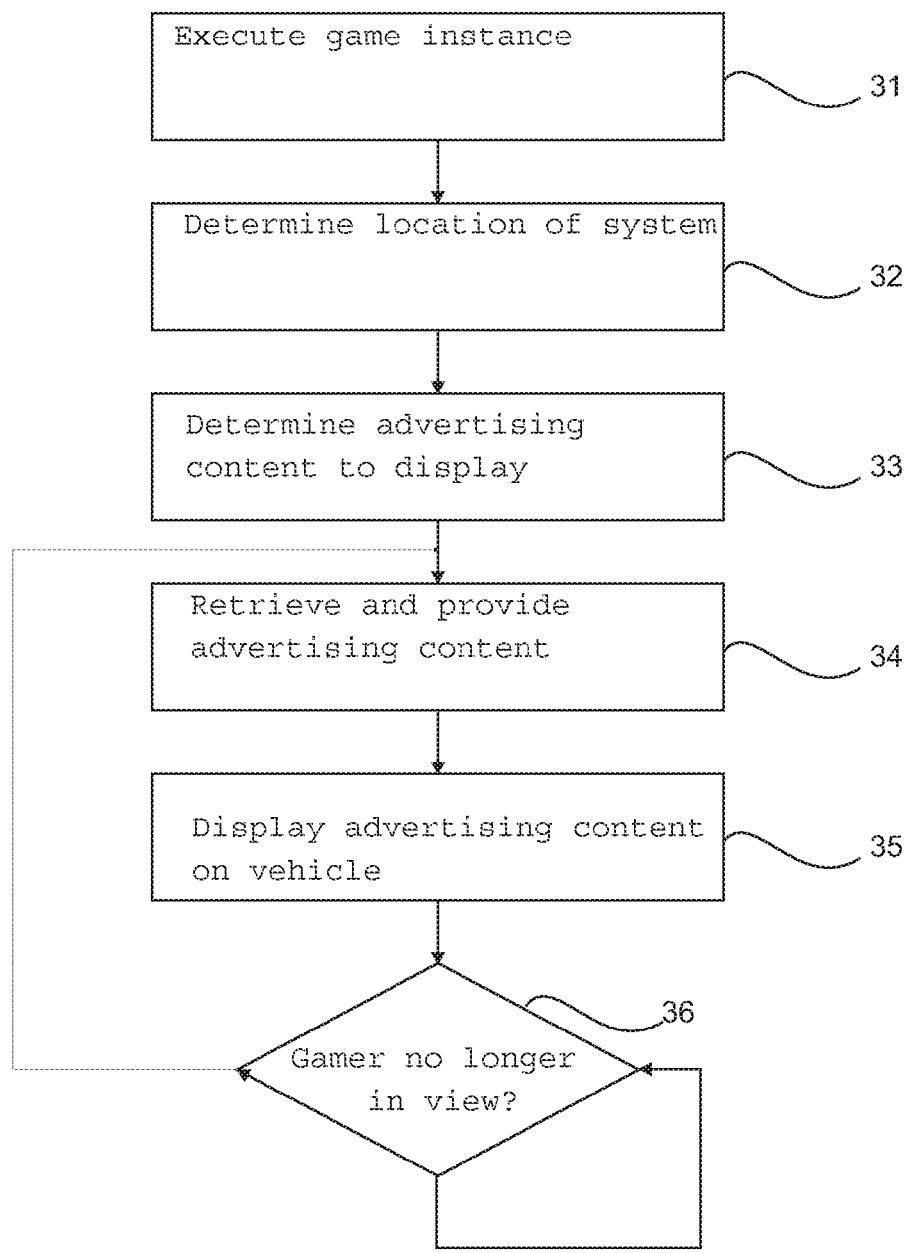
FIG. 3 shows a simplified flow diagram of another method of determining advertising content to insert within the vehicle 15.

Referring to FIG. 3, shown is a simplified flow diagram of another method of determining advertising content to insert within the vehicle 15. A game instance is executed at step 31. At 32, a location of the system in execution of the game instance is determined. The location is then used to determine appropriate advertising content to display on the vehicle 15 at step 33. At step 34, the appropriate advertising content is retrieved and provided to the game instance and at 35 the advertising content is displayed on the vehicle 15 within the spot 16. At 36, the game detects when a gamer is no longer within view of the vehicle 15 and returns to 34 to retrieve new appropriate content. The advertising content remains on the vehicle 15 until the gamer no longer has the vehicle 15 within their field of view. Alternatively, it remains persistent until the gamer moves outside a predetermined virtual space within the game.

Figure 4:
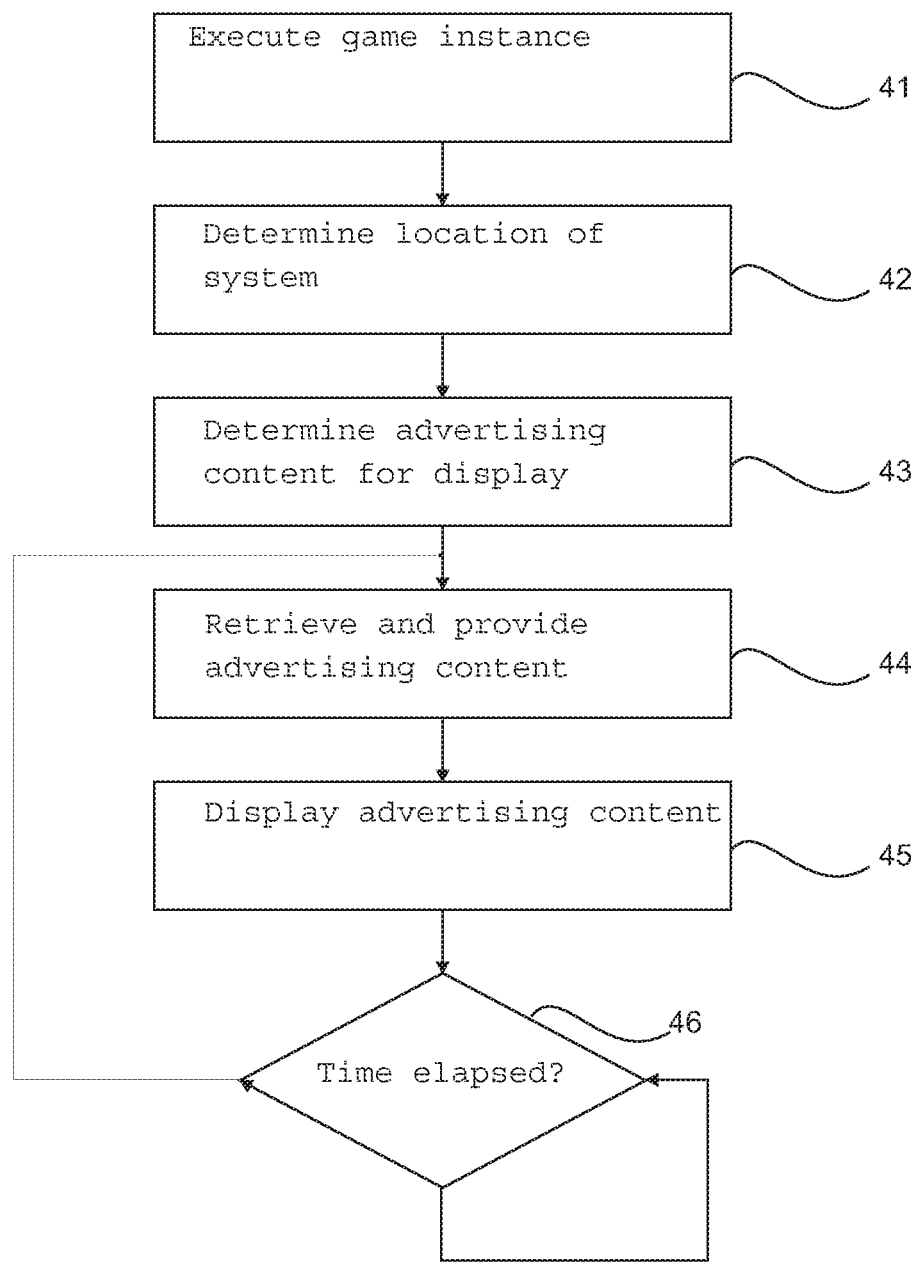
FIG. 4 shows a simplified flow diagram of another method of determining advertising content to insert within the vehicle 15.

Referring to FIG. 4, shown is a simplified flow diagram of another method of determining advertising content to insert within the vehicle 15. A game instance is executed at step 41. At 42, a location of the system in execution of the game instance is determined. The location is then used to determine appropriate advertising content to display on the vehicle 15 at step 43. At step 44, the appropriate advertising content is retrieved and provided to the game instance and at 45 the advertising content is displayed on the vehicle 15 within the spot 16. At 46, the game detects when a known time has elapsed and returns to 44 to retrieve new appropriate content. The advertising content remains on the vehicle 15 for approximately the known time and is then varied. Optionally, the time is only calculated when the vehicle 15 is within view. For example, every 15 seconds, the advertising content is varied wherein the 15 seconds is a length of time the spot 16 is displayed on a display of a gamer. Further optionally, "within view" is determined based on a quality of impression relating to a size of the spot 16 displayed within view and an ability to discern the contents thereof.

For each of the embodiments of FIGS. 2-4, determining appropriate advertising content is performed based on data stored with the advertisement data relating to geographic considerations for the advertisements in the form of real world geographic considerations. Alternatively, the data is stored on a server different from the server wherein the advertising data is stored. With the stored data and the location information, it is straightforward to locate appropriate advertising content as the video game and the location of the video game session is known.

Figure 5:
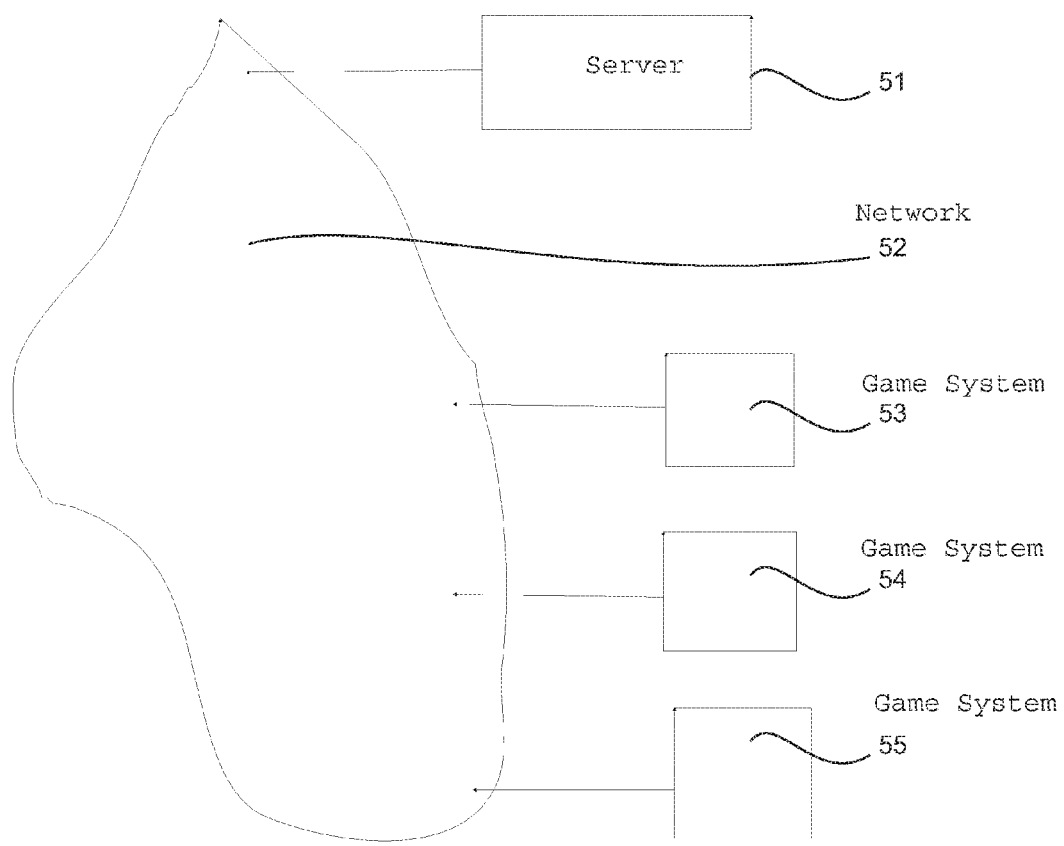
FIG. 5 shows a simplified block diagram of a system for playing of video games hosted on a server.

Referring to FIG. 5, shown is a simplified block diagram of a system for playing of video games hosted on a server. Here, the location of the server is not indicative of a location of a landed impression formed thereby and, as such, the location of the server is not an ideal indicator of location for determining an appropriate advertisement. Here, a server 51 is shown coupled via a broadband network in the form of a WAN such as the Internet 52 to a plurality of game systems 53, 54, and 55. A game is executed on the server 51 to be played by gamers on their game systems 53, 54, and 55. Thus, the location of the game session is a server location and is not related to the location of the gamers. Using the server location results in inappropriate advertising content when advertisements are geographically context sensitive. Of course, a simple solution is to require all advertisements to be geographically insensitive. Unfortunately, since most server-based games are available worldwide, removing geographic context from advertisements is often undesirable.

When a game is a single player online game, the server determines a location of the gamer instead of a location of the gaming session and then uses the location and information about geographic restrictions of advertising content for retrieving of appropriate advertising content. It will be apparent to those of skill in the art that as games are more mobile and as video games are more multiplayer in nature, providing appropriate advertising content becomes complicated. For example, a video game session played online over several days with a cell phone presents the problem that the location of the gamer may change substantially during the course of the single game. Alternatively, as more players play a single game, the disparate locations present a different problem.

Figure 6:
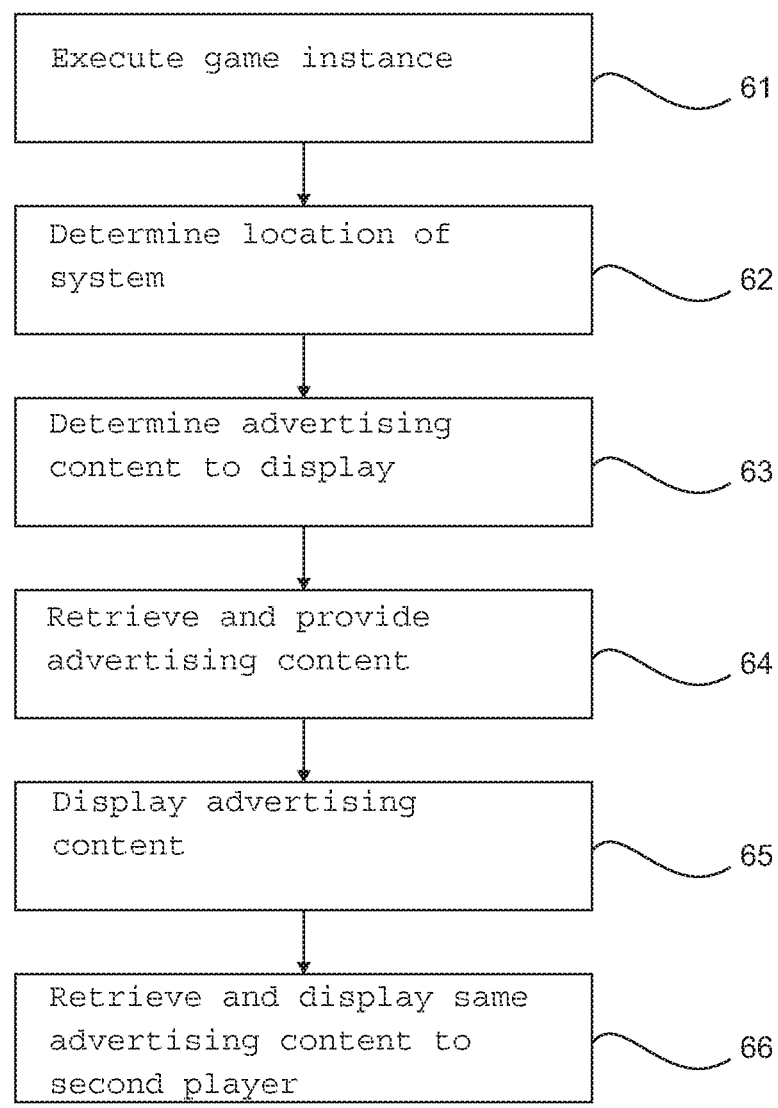
FIG. 6 shows a simplified flow diagram of a method of delivering appropriate advertising content for single player games wherein multiple players interact with a same one game.

Referring to FIG. 6, a method of delivering appropriate advertising content for single player games wherein multiple players interact with a same one game is shown in a simplified flow diagram of a method of determining advertising content to insert within the billboard 11. A game instance is executed at step 61. At 62, a location of the system in execution of the game instance is determined. The location is then used to determine appropriate advertising content to display on the billboard 11 at step 63. At step 64, the appropriate advertising content is retrieved and provided to the game instance and at 65 the advertising content is displayed within the billboard 11. The advertising content remains on the billboard 11 until the game instance is terminated and another game instance is executed. Optionally, the advertising content persists across game instances within a same session—a same execution of the game software. Alternatively, each new game play results in different advertising content being displayed on billboard 11.

At 66, a second other player at a remote location joins the game. Because the second other player has joined the same game session, the same advertising content is retrieved and displayed for the second other player. As such, the players can use the billboard as a landmark without confusion.

Figure 7:
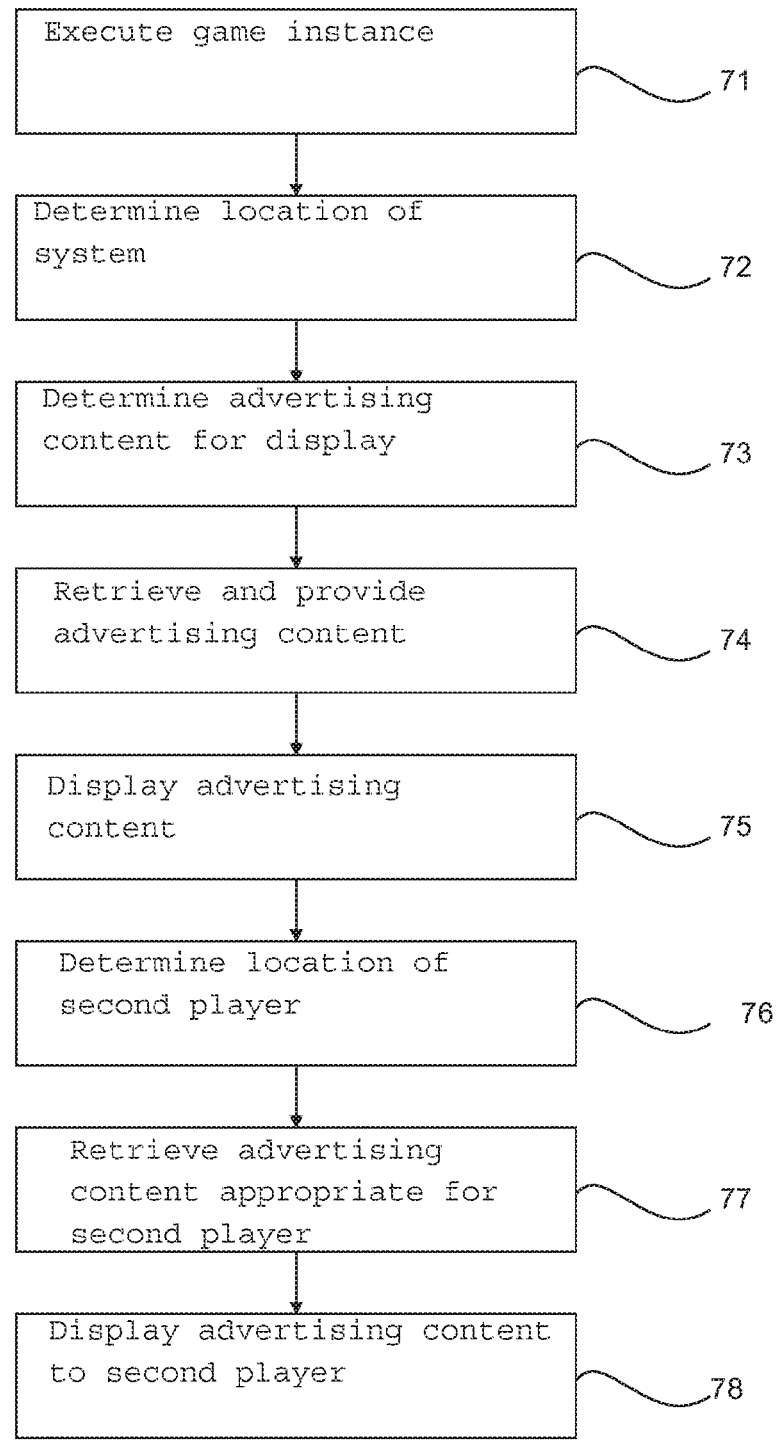
FIG. 7 shows a simplified flow diagram of another method of delivering appropriate advertising content for single player games wherein multiple players interact with a same one game.

Referring to FIG. 7, another method of delivering appropriate advertising content for single player games wherein multiple players interact with a same one game is shown in a simplified flow diagram of a method of determining advertising content to insert within the billboard 11. A game instance is executed at step 71. At 72, a location of the system in execution of the game instance is determined. The location is then used to determine appropriate advertising content to display on the billboard 11 at step 73. At step 74, the appropriate advertising content is retrieved and provided to the game instance and at 75 the advertising content is displayed within the billboard 11. The advertising content remains on the billboard 11 until the game instance is terminated and another game instance is executed. Optionally, the advertising content persists across game instances within a same session—a same execution of the game software. Alternatively, each new game instance results in different advertising content being displayed on billboard 11.

At 76, a second other player at a remote location joins the game. At 77 the location of the second other player is determined and at 77 appropriate advertising content for the second other player is retrieved. At 78 the appropriate advertising content is provided for display within the billboard of the second other player's system. Unfortunately, the players cannot use the billboard as a landmark without confusion because each billboard incorporates different advertising content.

Of course the advertising content displayed within the billboard is optionally changed at intervals either identically similar to the method of FIG. 6 or independently, more similar to the method of FIG. 7. Of course, when the object on which the advertising content is being displayed is not useful as a landmark, then it is typically preferable to use a method similar to that of FIG. 7.

Figure 8:
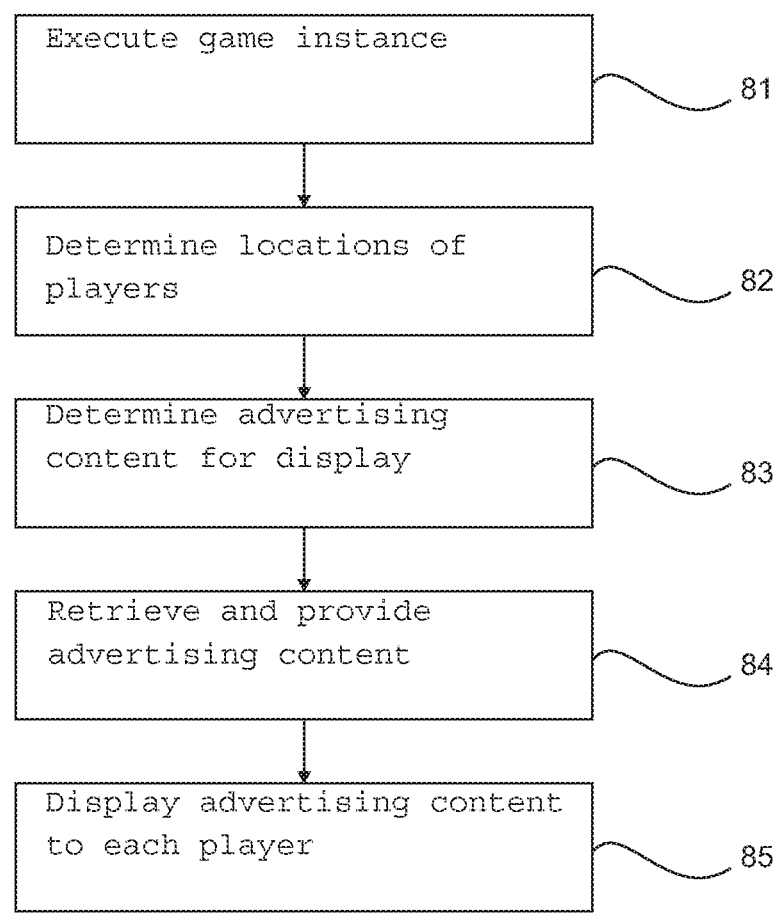
FIG. 8 shows a simplified flow diagram of a method of delivering appropriate advertising content for multiplayer games wherein multiple players interact with a server in execution of a game.

Referring to FIG. 8, a method of delivering appropriate advertising content for multiplayer games wherein multiple players interact with a server in execution of a game is shown in a simplified flow diagram of a method of determining advertising content to insert within the billboard 11. A game instance is executed on a server at step 81. The game session is for having a limited execution time with a limited group of players. At 82, a location of the players systems is determined. The locations are then used to determine appropriate advertising content to display on the billboard 11 at step 83. At step 84, the appropriate advertising content is retrieved and provided to the game instance and at 85 the advertising content is displayed within the billboard 11 for all the players to see. The advertising content remains on the billboard 11 until the game instance is terminated and another game instance is executed. Optionally, the advertising content persists across game instances within a same session—a same execution of the game software. Alternatively, each new game results in different advertising content being displayed on billboard 11. As such, the players can use the billboard as a landmark without confusion.

Figure 9:
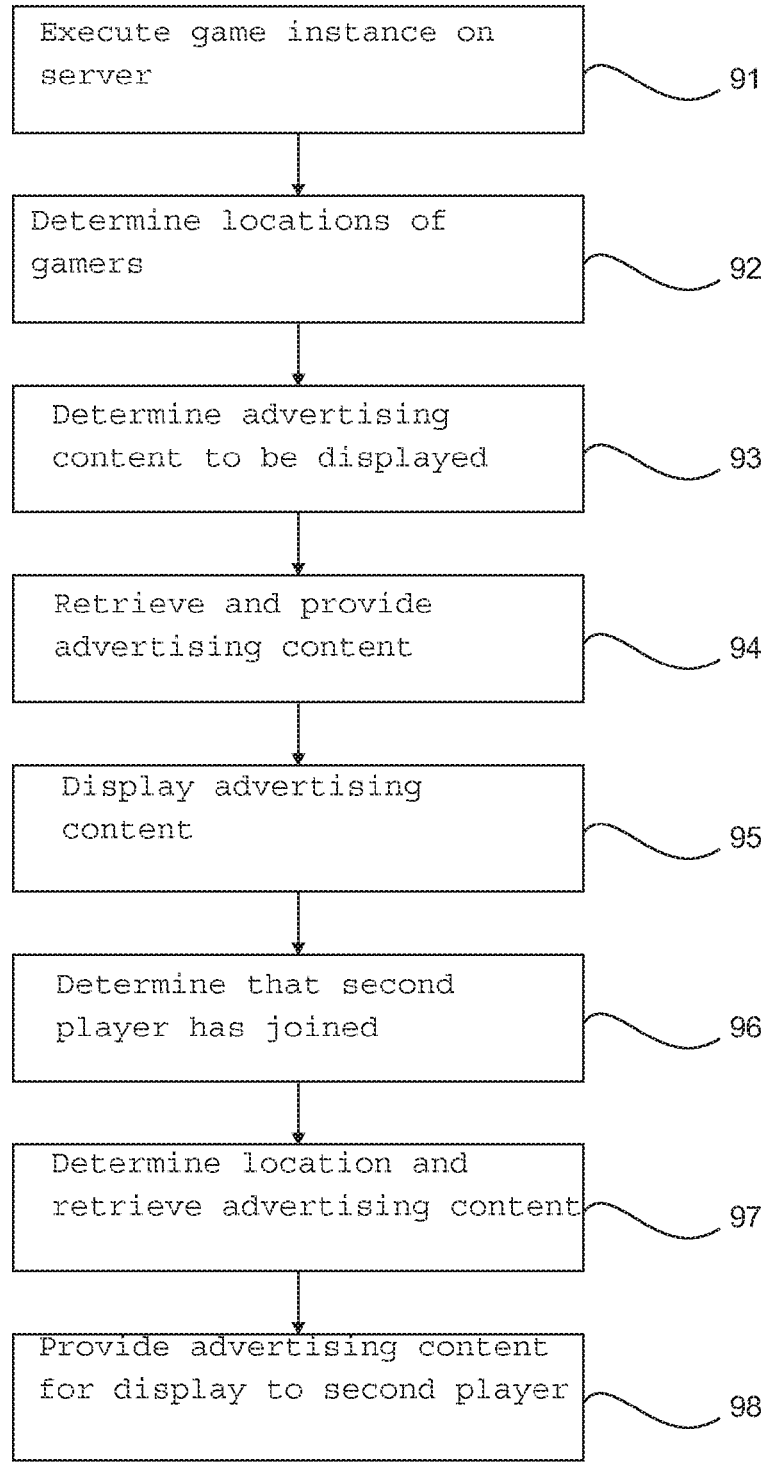
FIG. 9 shows a simplified flow diagram of another method of delivering appropriate advertising content for multiplayer games wherein multiple players interact with a game in execution on a server.

Referring to FIG. 9, another method of delivering appropriate advertising content for multiplayer games wherein multiple players interact with a game in execution on a server is shown in a simplified flow diagram of a method of determining advertising content to insert within the billboard 11. A game instance is executed on a server at step 91. At 92, a location of each gamer for the game instance is determined. The location is then used to determine appropriate advertising content to display on the billboard 11 for each gamer at step 93. At step 94, the appropriate advertising content is retrieved and provided to each gamer system such that each gamer sees advertising content that is either similar or different and at 95 the advertising content is displayed within the billboard 11. The advertising content remains on the billboard 11 until the game instance is terminated and another game instance is executed. Optionally, the advertising content persists across game instances within a same session—a same execution of the game software. Alternatively, each new game results in different advertising content being displayed on billboard 11. Further alternatively, the advertising content varies during the course of the game.

At 96, a second player at a remote location joins the game. At 97 the location of the second player is determined and at 97 appropriate advertising content for the second player is retrieved. At 98 the appropriate advertising content is provided for display within the billboard of the second player's system. Unfortunately, the players cannot use the billboard as a landmark without confusion because each billboard may have different content.

Of course the advertising content displayed within the billboard is optionally changed at intervals either identically similar to the method of FIG. 8 or independently, more similar to the method of FIG. 9. Of course, when the object on which the advertising content is being displayed is not useful as a landmark, then it is typically preferable to use a method more similar to that of FIG. 9.

When a new game session is invoked, advertising content is retrieved for that new game session in a similar fashion.

Figure 10:
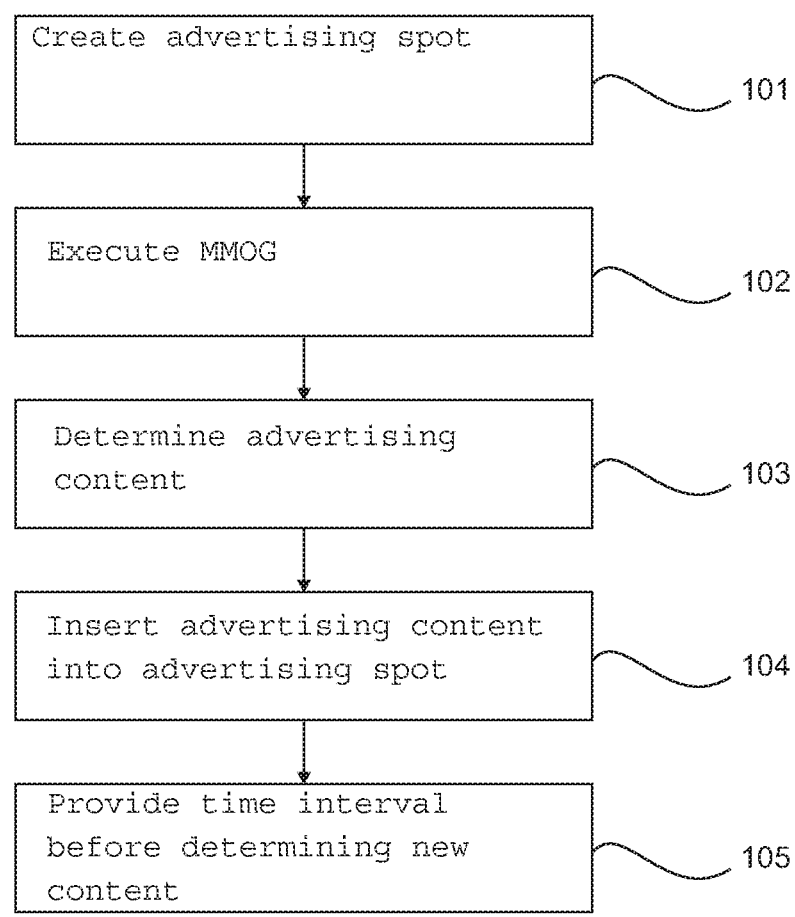
FIG. 10 shows a simplified flow diagram of a method of providing advertising content within massively multiplayer online games (MMOG)

Referring to FIG. 10, a simplified flow diagram of a method of providing advertising content within massively multiplayer online games (MMOG) is shown. In MMOG, it is common for a game session to continue for extended periods—nearly perpetually. Players join the MMOG and leave the MMOG at will and, as such, any number of independent players and/or groups of players is playing the MMOG at a given time. Further, more popular MMOG rarely, if ever, have a period of time when noone is playing them.

As such, advertisement locations that are suited to be landmarks are distinct and hard to vary due to their functionality. Even advertising spots ill conceived as landmarks are often used as temporary landmarks or visual cues and, as such lend confusion when different gamers see different advertisements. As such, perpetual consistent advertising content enhances the gamer experience. Conversely, if advertising content is perpetual and consistent across an MMOG community, then the value of the ad space is limited to one potential advertiser.

At 101, an advertising spot is created having distinctive visuals to be used as visual cues and an evidently temporary advertising content. This is accomplished, for example, by having the advertising content displayed on an active device such as a video display, or on a passive temporary device such as in chalk on a sidewalk or in an arrangement such as flowers or stones. At 102, the MMOG is executed on the server. At 103, an appropriate advertising content is determined for the advertising spot. At 104, the advertising content is inserted within the advertising spot. At 105, an interval is provided before returning to 103. For example, the interval is determined based on a time the advertising content is displayed. Alternatively, it is determined based on a number of impressions or a number of unique impressions. Alternatively, it is determined based on an absence of anyone in view of the advertising spot. Further alternatively, it is determined based on another criteria.

Thus, at intervals, the advertising content is updated within the MMOG without impacting the use of the advertising spot as a visual cue and without impacting on game play. Further, by using different criteria for changing the advertising content, it is possible to design advertising spots for supporting increased revenue potential. In order to support advertising spots with different criteria, data is stored indicative of the criteria and in association with the ad spots as described hereinbelow.

Figure 11:
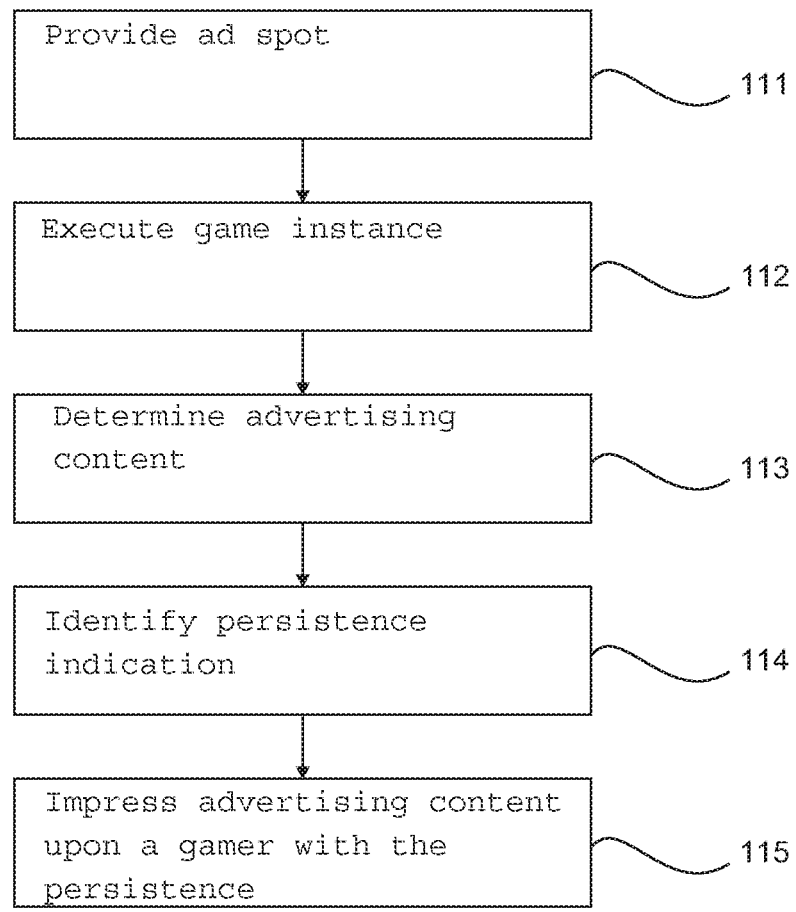
FIG. 11 is a simplified flow diagram of a method for supporting advertisements having different persistence.

Referring to FIG. 11, a method for supporting advertisements having different persistence is shown. At 111 an ad spot is provided within a video game. At 112, an instance of the video game is executed. At 113, appropriate advertising content is determined for the advertising spot and the advertising content is provided to the game instance. At 114, at least one of the game, the advertising spot characteristics and the advertising content characteristics includes a persistence indication for indicating an intended persistence of the advertising content within the advertising spot within the game. When the persistence indication is that the advertising content has session persistence, then the advertising content is for impressing upon a gamer throughout the session. During the session, the advertising content other than varies. Alternatively, when the advertising content has an indication of no persistence, then the advertising content is varied upon completion of a satisfactory impression, however that is indicated by at least one of the game, the advertising spot characteristics and the advertising content characteristics. At 115, the advertising content is impressed upon a gamer with the indicated persistence.

When the advertising spot is provided within a multiplayer game, the persistence indication optionally includes information specific to multiplayer games. For example, whether the advertising content is persistent while the advertisement is being impressed upon at least a gamer. Another example, is whether the advertising content is persistent across different gamers—ubiquitous—such that each gamer sees a same advertising content. The advertising content is further optionally approximately ubiquitous wherein a set of advertising content is provided and different content is impressed upon different gamers, the different content similar in nature. For example, an advertisement for a soft drink has a same look but is translated into different languages for gamers in different geographic locations. Thus, the advertising content is somewhat ubiquitous and yet maintains impression value cross culture.

For a single player game, persistence characteristics are used to indicate an longevity of an advertisement within a game. For example, an advertisement displayed on a billboard of a driving game optionally is persistent for an entire level of the game. Alternatively, the advertisement is persistent during a lap. Further alternatively, the advertisement is persistent for a length of time for forming an impression and is then replaced or varied. In a multiplayer driving game, the persistence characteristics supported are more varied. That said, even for these simple characteristics there is additional complexity. When an advertisement is persistent for a lap, what happens when one racer is ahead of another by a complete lap. Do they each have impressed upon them different advertising content? This is determined based on at least one of the game and the persistence indication. When an advertisement is not persistent, then the advertisement is changed when a sufficient number of the gamers playing in the multiplayer game have had the advertisement impressed thereon.

In multiplayer environments, impressions are also tracked differently. For example, an advertising content intended for impression within a first geographic region is potentially displayed outside that region. Similarly, an advertising content intended for impression within a time period is potentially displayed outside that time period either due to players being in different time zones or due to an inability to change the advertising content in time due to persistence indications. For example, an advertising content for being impressed before 5:00 PM is impressed until 5:00 PM. At 5:00 PM the video game in execution awaits an opportunity to change the advertising content. The opportunity may only arise after 5:00 PM and yet impressions are occurring until such time as the advertising content is changed. In such a situation, the advertising content impressed upon gamers outside of campaign region is tracked and impression statistics are provided for these impressions but they are tracked separately to assist in billing or not billing of impressions beyond the scope of the advertising campaign.

Figure 12:
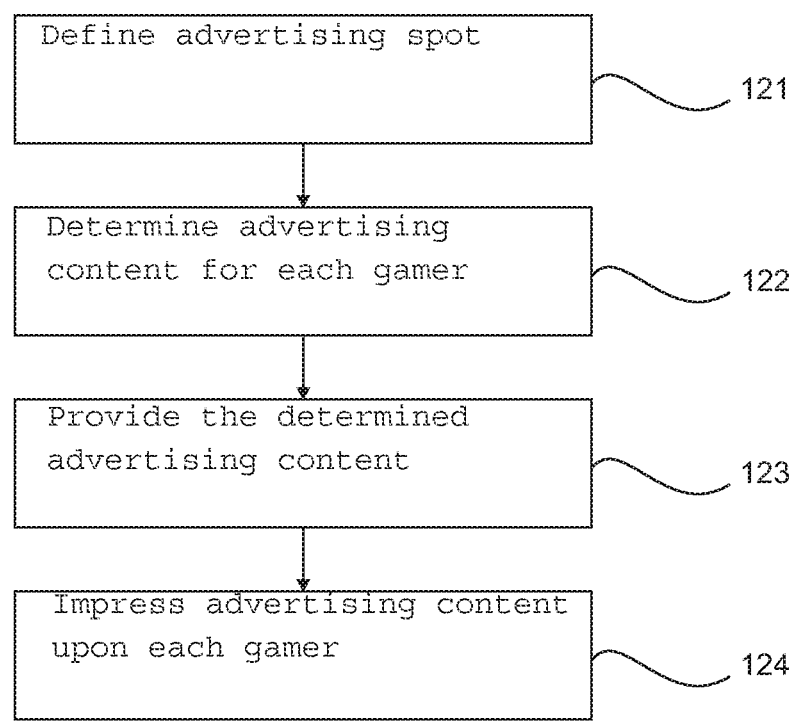
FIG. 12 shows a simplified flow diagram of another method wherein advertising content is impressed upon gamers of a multiplayer game without persistence or ubiquity.

Referring to FIG. 12, shown is a simplified flow diagram of another method. Here, advertising content is impressed upon gamers of a multiplayer game without persistence or ubiquity. An advertising spot is defined at 121. The advertising spot includes characteristic data including a persistence indication indicating a lack of persistence and ubiquity. An example of such an advertisement spot is a video display screen within a building in the virtual world. Here at 122, for each gamer advertising content is determined independently and is provided at 123 and impressed upon the gamer independently at 124. As such, each gamer sees advertising content provided but that advertising content is not guaranteed to be correlated with advertising content displayed to other gamers at a same instance. Tracking of impressions and accounting for geographic issues is facilitated when persistence and ubiquity are other than desired.

Figure 13:
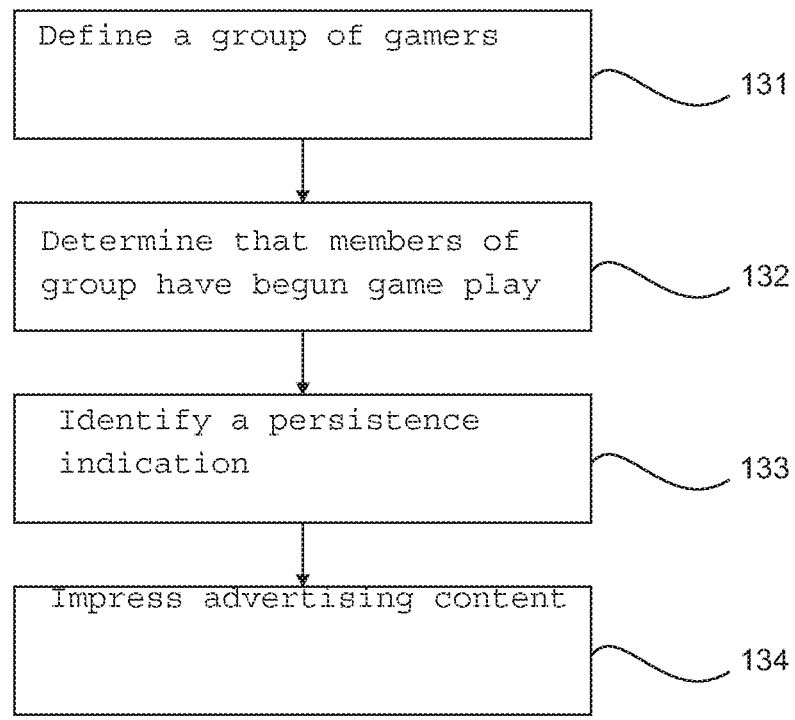
FIG. 13 shows a simplified flow diagram of a method for supporting group ubiquity and persistence.

Referring to FIG. 13, shown is a simplified flow diagram of a method for supporting group ubiquity and persistence. A group of gamers is defined at 131. Here, for example, the group registers itself as a community, unit, family or gang. The group operates together whether in cooperation or adversarialy in game play. Since the group is playing the game together, they are treated as a group for advertising purposes when this is supported. At 132 the group or some members thereof begin playing the game. While the group is playing the game, the term group session will be used to describe a time interval during which members of the group continue to play. For a MMOG wherein the group includes all registered users, the group session is approximately perpetual. With a smaller group, the group session is typically considerably shorter.

At 133, at least one of the game, the advertising spot characteristics and the advertising content characteristics includes a persistence indication for indicating an intended persistence of the advertising content within the advertising spot within a group session. When an advertising spot has a group session persistence that is persistent, then the advertising content for that advertising spot remains unchanged throughout the group session. Such an advertising spot is useful in game play as a landmark or for other purposes, but does not remain persistent across group sessions. The at least one of the game, the advertising spot characteristics and the advertising content characteristics optionally includes a group ubiquity characteristic indicating whether or not all members of the group are impressed with a same advertising content. For a landmark, persistence and ubiquity are important. For a fleeting glimpse, they are likely of less concern. That said, the video game provider has an option to design the game to set the persistence and ubiquity of advertising spots. Alternatively, the advertiser has an ability to insist on a level of persistence and/or ubiquity. Further alternatively, persistence and ubiquity are characteristics of an advertising spot that are stored in association therewith and are therefore easily modifiable.

At 134, the advertising content is impressed upon at least a gamer from the group of gamers.

Alternatively, groups are determined through analysis of actual game play. Gamers who interact commonly within a gaming space are automatically grouped together for group persistence and group ubiquity measures. Further alternatively, grouping occurs based on projected interactions based on knowledge of past game play, either statistical or for particular gamers. Thus, for gamers who enter a fortress, it is known that 80% will follow a given path within the virtual world of the game. Thus gamers they will encounter on that path within a predetermined time frame such that an impression content benefits from ubiquity are grouped together. This links disparate players who are unknown one to another in order to maintain the realism of game play and the consistency of the virtual world for that game play.

In order to determine appropriate advertising content, advertising data is stored in conjunction with classification information. The classification information is for use in determining appropriateness of advertising content data for use in particular game session. For example, classification information relates to geographic location for which advertising content is intended. Thus, an advertisement that is in French has classification data indicating that it is appropriate for use in French speaking countries or has a data indicating the French speaking countries. Optionally, advertising content characteristic data includes persistence and ubiquity data.

When each advertising spot is directly associated with advertising content therefor, a single advertising spot has more than a single advertising content each having classification data to assist in distinguishing therebetween, when necessary. For example, the billboard 11 of FIG. 1 has three advertisements within the United States, two advertisements within France, an advertisement for Germany and six advertisements for Japan. When a gamer is located in Germany, the advertisement available for Germany is provided. When a gamer is in Japan, any advertisement of the six advertisements is provided.

Though geographic classification data is described on a national basis, the geographic restrictions are optionally continental, state, city, or on another geographic basis.

Another classification for advertisements is time of day. Some advertising content is not well suited to display at some times of day. In the United States, it is commonly recognized that after certain hours, racier content is permitted. Thus, some racier advertising content optionally is classified as such and is for display after a predetermined time. In order to determine the time, a location of the gamer system is determined. Alternatively, a time is retrieved from a clock of the gamer system. Further alternatively, another method is employed. By classifying an advertisement based on time of display, appropriate advertising content is identifiable. Unfortunately, for persistent advertising content, this limits some of the methods described hereinabove.

Though the above embodiments address identification of appropriate advertising content for many different situations, they do so based on a generic advertising spot. This need not be the case. Referring to FIG. 14, a plurality of advertising spots are listed each with a set of descriptors associated therewith. Within the list are 6 advertising spots 14a through 14f. For each advertising spot there are a plurality of descriptors including: persistence, ubiquity, location of the spot within the game, reachability of the spot, size of the spot, type—video, still image, audio, mixed, degree of interaction with the content by the gamer, number of advertisements supported by the spot, duration of the presentation.

Persistence indicates a persistence of advertising spot content. For example, an ad on a dashboard of a race car for a racing game and being driven by the gamer is unlikely to be changeable within a race without causing distraction. Therefore, its persistence should be at least a level. An advertising spot that is written in chalk on a sidewalk optionally has no set persistence. Other advertisements optionally are permanent in nature, persistent for a game, persistent across a session, persistent across a group of gamers for a game or for session, or persistent while being viewed.

Ubiquity indicates a number of gamers within a multi-player game that should see an identical or very similar advertisement. For example, a major landmark should have the same advertisement for all gamers who will interact in a fashion that may require identification of the landmark—by voice or by chat. Conversely, minor differences in the games will likely go unnoticed. Thus ubiquity indicates all gamers, a subset of gamers, or that ubiquity is inessential.

Location of the advertising spot provides an indication of the type of location wherein the spot is. Exemplary locations include moving, panel, scenery, target, inventory, and equipment. Moving advertising spots include automobiles, other players, aircraft, and so forth. Panel indicated that the advertising spot is within an information panel of the game. Scenery indicates that the advertising spot is within background scenery such as a billboard or on a building. Target indicates that the advertising spot is within a goal or target of the game. For example, an advertising spot is on an enemy to be killed or on a door that divides user levels. Inventory indicates that an advertising spot is on an inventory item or items and equipment relates to inventory items that are commonly used such as a vehicle in a driving game, a gun in a first person shooter, and a skateboard in a skateboarding game.

Reachability refers to a likelihood that an advertising spot is reached during game play. Clearly, an advertising spot at the very start of the game has a reachability of 100% when expressed in percentage. Advertising spots later in a game have lower reachability as do advertising spots outside the game plot.

Size refers to a size of the advertising spot as displayed to a gamer. An advertisement on the dashboard of a car being driven by a gamer is often smaller than an advertisement on a billboard. That said, because size is not the only determinative factor for value, this will vary depending on the advertising spot location and design.

Type indicates content for an advertising spot. Clearly, it would be difficult to insert an audio advertisement within a texture based advertising spot. As such, indicating the type of the spot is important.

Interaction indicates an anticipated amount of interaction or focus of the gamer on a particular advertising spot. More focus is typically considered advantageous by advertisers. Typically, more interaction requires more focus.

Number of advertisements supported indicates how many advertisements are supported simultaneously within an advertising spot. This is useful for cyclic advertising spots such as changing billboards and for advertising spots having support for numerous advertisements therein such as walls for graffiti or posters, stores for clothing and consumer goods, and so forth. Some advertising spots will support only a single advertiser/advertisement while others support multiple placements, optionally from multiple different advertisers.

Duration indicates an expected amount of time an ad will be displayed to a gamer. An ad on a dashboard of a vehicle being driven by the gamer is displayed while the vehicle is driven. For a driving game, this results in a very long duration. Conversely, a billboard typically is only in view for a short duration.

The characteristics are context driven. For example, an ad shown on the side of a race car in a driving game might be constant for the entire race; on the other hand, the billboards surrounding the race track might rotate through a few advertisements every 30 seconds or so—behavior which is common in the real world. Similarly, a spot associated with the race track scoreboard in the form of a Jumbotron® might display one of many advertisements every 5 to 10 seconds, based on the requirements of the advertisers.

Together, the spot characteristics contribute to establish the value of the spot. For example, a spot that is always guaranteed to be viewed by the gamer because it is on a required path or at a crucial access point in the game has a higher value than a spot buried deep in the game at which only a handful of players ever arrive. Similarly, an ad that is constant throughout the game has a higher value than a 5 second spot displayed on a scoreboard. Individual advertisers select advertisements whose attributes and values satisfy their required reach and budgetary constraints.

By storing characteristics with advertising spot definitions, it is a straightforward matter for advertisers to search available advertising spots to isolate those that meet their criteria and then to choose advertising opportunities based on their search results. Further, when an advertising campaign is successful and finishes, a system performing a search for similar advertising spots indicates potential advertisers to fill the now vacant advertising spots left by the finished advertising campaign.

Also, some of the characteristics are used by the gaming system in determining aspects of the advertisements for display. For example, persistence is important in determining when to retrieve new advertising content for an advertising spot.

In an alternative embodiment, characteristics dependent upon game play are determined and updated during a lifespan of a game. Thus reachability is a statistical value based on actual games played as opposed to a projection of the game producer or developer. Advantageously, the characteristics so calculated are automated and based on history and, as such more defensible.

Optionally, some characteristics are stored in association with advertising content while others are stored in association with advertising spots or globally for a game or for a platform.

Optionally, the advertising content has characteristic data stored in association therewith indicating minimum display times, impression definition data, and other billing or contractual related data. This data is then used during game execution to ensure that the advertiser receives value for their reported impressions and that the game provider monetises the impressions by meeting contractual obligations therefore. Other examples of billing related characteristics include geographic limitations for an advertising campaign, time restrictions for an advertising campaign, unique impressions, and interval between impressions to a same game instance. Optionally other characteristics are also stored in association with the advertising content.

Figure 15:
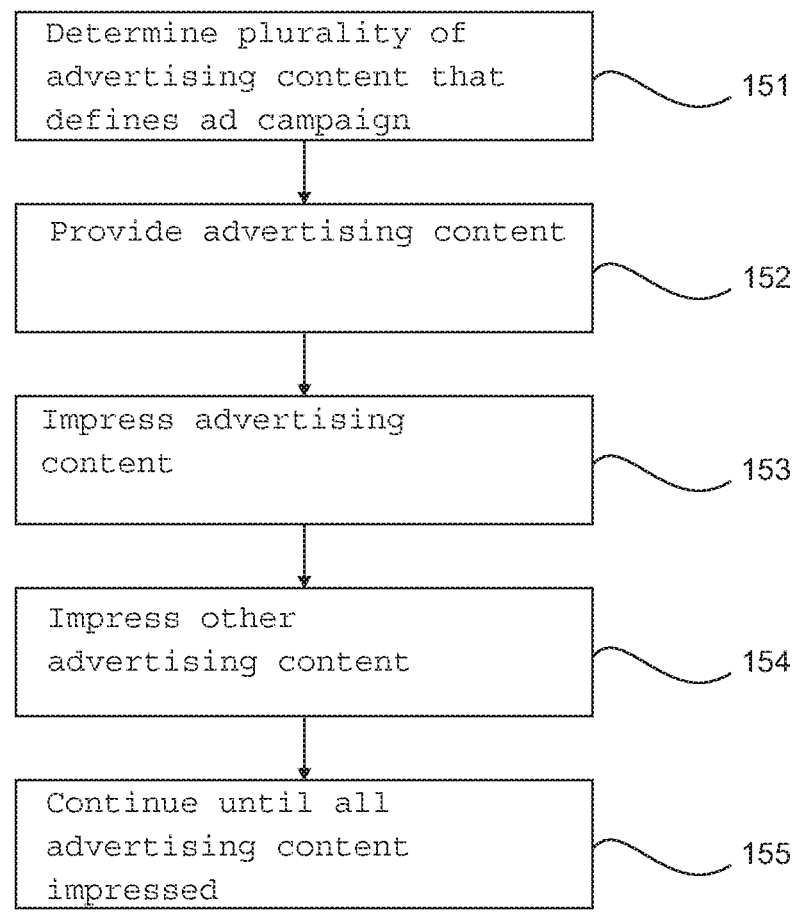
FIG. 15 shows a simplified diagram of a method of displaying advertising campaigns in a single player environment wherein a group of advertisements forms a campaign and it is desired to show a gamer each ad within the group of advertisements.

Referring to FIG. 15, a method of displaying advertising campaigns in a single player environment is shown wherein a group of advertisements forms a campaign and it is desired to show a gamer each ad within the group of advertisements. Alternatively, a known subset of the group of advertisements is to be shown to the gamer. At 151, a plurality of advertising content forming an advertising campaign is determined. The plurality of advertising content is provided from an ad server to an instance of the game in execution on a system at 152. At 153, advertising content from the plurality of advertising content is impressed within one or more advertising spots within the game instance. At 154, as each advertising content is impressed on the gamer in accordance with a set of rules defining an impression, another advertising content from the plurality of advertising content is impressed within a same advertising spot. At 155, this process continues until the known group of advertising content is impressed upon the gamer. Optionally, the advertising content is impressed in a predetermined sequence with predetermined temporal spacing between each advertising content. Further optionally, the advertising content is impressed in different game sessions to further temporally space the advertising campaign. Alternatively, the advertising content is changed after a predetermined event, either in the game or outside thereof.

Figure 16:
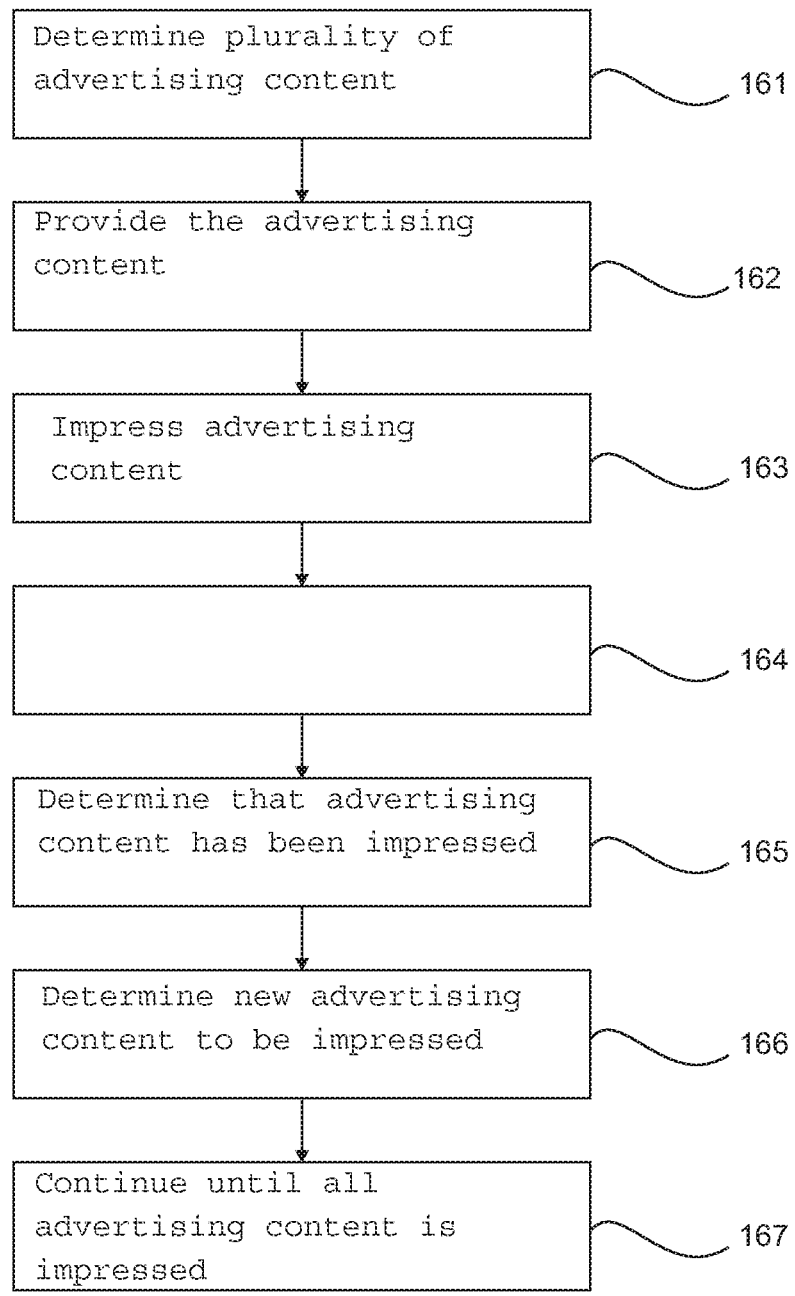
FIG. 16 shows a simplified diagram of a method of displaying advertising campaigns in a single player environment wherein a group of advertisements forms a campaign and it is desired to show a gamer each ad within the group of advertisements in a predetermined order; and, FIG. 17 shows a simplified diagram of a method of displaying advertising campaigns in a multiplayer environment wherein a group of advertisements forms a campaign and it is desired to show each gamer each advertisement within the group of advertisements or a known subset of the group of advertisements within a predetermined sequence.

Referring to FIG. 16, a method of displaying advertising campaigns in a single player environment is shown wherein a group of advertisements forms a campaign and it is desired to show a gamer each ad within the group of advertisements in a predetermined order. At 161, a plurality of advertising content and an ordering thereof forming an advertising campaign is determined. The plurality of advertising content is provided from an ad server to an instance of the game in execution on a system at 162. At 163, advertising content from the plurality of advertising content is impressed upon the gamer within one or more advertising spots within the game instance. Once sufficiently impressed as determined at 165, the process continues to 166. If the advertising content is other than sufficiently impressed the same advertising content is impressed until it is sufficiently impressed. Optionally, the same advertising content is impressed in each of a plurality of advertising spots to compress the time of the advertising campaign. Alternatively, the advertising content is impressed within a same advertising spot rendering the advertising campaign across a plurality of gaming sessions.

At 166, a new advertising content from the plurality of advertising content is determined and the process returns to 163 where it is impressed upon the gamer in a same or different advertising spot. At 167, this process continues until the known group of advertising content is impressed upon the gamer. Optionally, the advertising content is impressed in a predetermined sequence with predetermined temporal spacing between each advertising content. Further optionally, the advertising content is impressed in different game sessions to further temporally space the advertising campaign. Alternatively, the advertising content is changed after a predetermined event, either in the game or outside thereof.

Figure 17:
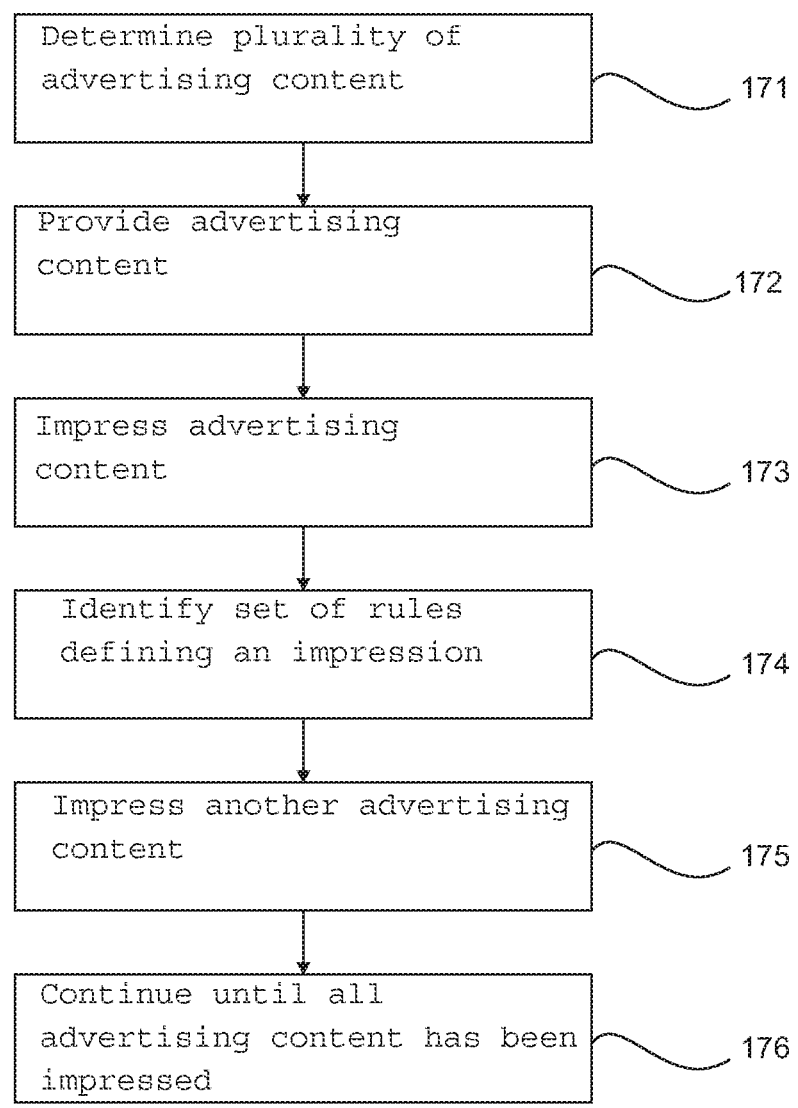

Referring to FIG. 17, a method of displaying advertising campaigns in a multiplayer environment is shown wherein a group of advertisements forms a campaign and it is desired to show each gamer each ad within the group of advertisements or a known subset of the group of advertisements within a predetermined sequence. At 171, a plurality of advertising content forming an advertising campaign is determined. The plurality of advertising content is provided from an ad server to instances of the game in execution on a system at 172. At 173, advertising content from the plurality of advertising content is impressed within one or more advertising spots within the game instances in accordance with a ubiquity characteristic of the advertising content and of the advertising spot. When ubiquity is unimportant, the method essentially is a plurality of single user methods. When ubiquity is important, at 174 as each advertising content is impressed on each of the plurality of gamers in accordance with a set of rules defining an impression. Once all gamers within the group have had the advertising content impressed thereon, another advertising content from the plurality of advertising content is impressed within a same or different advertising spot at 175. At 176, this process continues until the known group of advertising content is impressed upon the gamer. Optionally, the advertising content is impressed in a predetermined sequence with predetermined temporal spacing between each advertising content. Further optionally, the advertising content is impressed in different game sessions to further temporally space the advertising campaign. Alternatively, the advertising content is changed after a predetermined event, either in the game or outside thereof. Optionally, advertising impression statistics for impression values relating to gamers impressed beyond the minimum required impression statistics are maintained for reporting. Further alternatively, billing is based on actual impression statistics. When billing is based on achieving the campaign goals, a minimum impression criteria is met or exceeded by each player within the game and, as such, some players are likely well beyond the minimum impression criteria for each of the plurality of advertising content.

Alternatively, when sequencing is unimportant, the advertising content is impressed within each of a plurality of different advertising spots concurrently such that each gamer is impressed, potentially in a different order, with the subset or with each advertising content from the plurality of advertising content. Again, since advertising content is impressed until the minimum threshold for an impression is achieved by each gamer within the group, many of the gamers within the group will have impressions that far exceed the minimum criteria for a landed impression.

Alternatively, advertising content is associated with a characteristic such that it is only impressed in one of a multiplayer game and a single player game. Such a characteristic allows some advertising content to only be displayed in single player mode even when a game supports a multiplayer mode of operation.

Alternatively, though the invention described hereinabove describes determining a geo-location of at least a player of a multiplayer video game, the determination of location is optionally performed by the server, by another server, by a central server, by a third party geo-location server, or by a system of the at least a player of the multiplayer video game.

When access to the advertising server is other than available, an ad spot supporting dynamic advertising content delivery is filled with content from the local system. As such, optionally advertising data is retrieved from a cache. Further alternatively, the advertising content is retrieved from a storage medium having the game software stored thereon and forming a default advertisement for being displayed when access to an advertising service is unavailable and current advertisement content for an advertising spot is other than available from within the cache.

Alternatively, changes to advertising content within an advertising spot occur within a storyline of a game session. For example, a wall or a billboard having advertising content displayed thereon is repainted by game session characters during the game session in order to result in a change in advertising. Alternatively, an automobile branded and forming an advertisement is stolen or destroyed by game session events in order to allow for a new replacement vehicle having different advertising content. Further alternatively, gamers playing within a gaming session are provided incentives to destroy or change existing advertising content. An award is offered for stealing the vehicle or an award is offered for painting or destroying the billboard.

Of course, a stand such as a drink stand is optionally moved or replaced to change advertising content. Further optionally, it is destroyed through game session events.

Numerous embodiments may be envisaged without departing from the spirit or scope of the invention.

What is claimed is:

1. A computer implemented method comprising:
   receiving a request for providing an advertisement to be displayed in an advertisement spot, the advertisement spot being included in a game session of a game in execution and having a plurality of gamers engaged therein, the plurality of gamers playing in a plurality of locations, one remote from another;
   obtaining at least one advertisement for being displayed within the advertising spot based on data relating to at least one of the plurality of gamers;
   determining, by one or more computers, that a first advertisement is to be impressed upon each gamer of a group of multiple gamers of the plurality of gamers when an advertising spot characteristic of the advertising spot indicates that each member of the group should be impressed with the same advertising content in the advertising spot;
   determining, by the one or more computers, that a second, different advertisement is to be impressed upon one or more games of the group of multiple gamers when the advertising sport characteristic indicates that members of the group should be impressed with different advertising content in the advertising spot; and
   providing for display the first or the second advertisement within the advertising spot during the game session to each gamer of the group of multiple gamers.

2. A method according to claim 1 wherein the data relating to at least one of the plurality of gamers comprises geographic data relating to at least one of the multiple gamers of the plurality of gamers, the geographic data indicating a real-world location of the at least one of the multiple of the plurality of gamers.

3. A method according to claim 2 wherein the geographic data relates to each of the multiple gamers of the plurality of gamers and wherein obtaining the advertisement comprises obtaining an advertisement best suited to the geographic data.

4. A method according to claim 1 wherein the game session is a session of a multiplayer online game.

5. A method according to claim 4, further comprising providing for display a third, different advertisement within the advertising spot for another group of multiple gamers of the plurality of gamers based on the advertising spot characteristic.

6. A method according to claim 4 wherein the obtained advertisement is persistent for a predefined time period based on a persistence characteristic associated with the advertising spot.

7. A method according to claim 6:
   wherein the predetermined time period is shorter than the gaming session; and
   further comprising obtaining a third advertisement; and
   providing for display the third advertisement within the advertising spot, wherein the obtained second advertisement is persistent for the predetermined time period.

8. A method according to claim 6, wherein the predetermined time period is a complete session.

9. A method according to claim 4 wherein a persistence of the obtained advertisement is based on a predetermined persistence characteristic associated with the advertising spot.

10. A method according to claim 4 wherein the data relating to at least one of the plurality of gamers comprises geographic data relating to the plurality of gamers.

11. A method according to claim 1 wherein obtaining the at least one advertisement comprises:
providing characteristics associated with the advertising spot, and
receiving the at least on advertisement determined to be appropriate for the data relating to the at least one of the plurality of gamers, for the characteristics associated with the advertising spot.

12. A method according to claim 1
wherein the game session is a multiplayer game hosted by a player of the multiplayer game; and
wherein the data comprises geographic data relating to the hosting player.

13. A system comprising:
a server system in communication with multiple gaming systems over a network;
the server systems comprising:
at least one processor;
a data storage device storing instructions that when executed by the processor cause the processor to perform the operations comprising:
receiving a request for providing an advertisement to be displayed in an advertisement spot, the advertisement spot being included in a game session of a game in execution and having a plurality of gamers engaged therein, the plurality of gamers playing in a plurality of locations, one remote from another;
obtaining at least one advertisement for being displayed within the advertising spot based on data relating to at least one of the plurality of gamers;
determining that a first advertisement is to be impressed upon each gamer of a group of multiple gamers of the plurality of gamers when an advertising spot characteristic of the advertising spot indicates that each member of the group should be impressed with the same advertising content in the advertising spot;
determining that a second, different advertisement is to be impressed upon one or more games of the group of multiple gamers when the advertising sport characteristic indicates that members of the group should be impressed with different advertising content in the advertising spot; and
providing for display the first or the second advertisement within the advertising spot during the game session to each gamer of the group of multiple gamers.

14. A system according to claim 13,
wherein the providing comprises providing the first or second advertisement for display for a length of time to the multiple gamers based on the advertising spot characteristic, wherein the advertisement spot characteristic specifies a longevity of advertisements displayed in the advertisement spot.

15. A system according to claim 13,
wherein the providing comprises providing the first or second advertisement for display for a length of time to the multiple gamers based on a characteristic associated with the advertisement, wherein the characteristic associated with the advertisement specifies a longevity of the advertisement.

16. A system according to claim 14,
the operations further comprising:
obtaining the at least one advertisement for being presented within the advertising spot based on the longevity specified by the advertisement spot characteristic matching a longevity specified by a characteristic associated with the advertisement.

17. A method according to claim 14 wherein the longevity relates to one of an elapsed time in the game session and an elapsed time independent of the game session.

18. A computer implemented method comprising:
providing a game session of a game in execution and having a plurality of gamers engaged therein, the plurality of gamers playing in a plurality of locations, one remote from another, the game having an advertising spot for displaying an advertisement within the video game;
determining, using one or more data processing apparatus, a first advertisement for being presented within the advertising spot;
providing for display the first advertisement within the advertising spot for a length of time less than the game session, the length of time determined based on a characteristic associated with the advertising spot, the characteristic identifying a longevity of advertisements displayed in the advertising spot;
determining, using the one or more data processing apparatus, a second advertisement for being presented within the advertising spot and for replacing the first advertisement; and
providing for display the second advertisement to replace the first advertisement within the advertising spot for the length of time after the first advertisement was displayed.

19. A method according to claim 18,
wherein the length comprises a length of time for forming an impression of the first advertisement on at least one of the plurality of gamers; and
wherein the second advertisement is provided for display after the first advertisement is displayed for the length of time.

20. A method according to claim 18 wherein the second advertisement is presented after the first advertisement is impressed upon each of the plurality of gamers for the length of time.

21. The method of claim 18,
further comprising determining a group of the plurality of gamers based on a ubiquity characteristic associated with the advertising spot;
wherein the providing for display the first advertisement comprises providing for display the first advertisement to the group of the plurality of gamers.

22. The method of claim 21, wherein the determining the group of gamers comprises determining the group of gamers are registered together as a group.

* * * * *